(12) United States Patent
Werner

(10) Patent No.: US 6,381,945 B2
(45) Date of Patent: May 7, 2002

(54) FUEL PREHEATING IN A GAS TURBINE

(75) Inventor: Klaus Werner, Goch (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/817,673

(22) Filed: Mar. 26, 2001

Related U.S. Application Data

(63) Continuation of application No. PCT/DE99/02985, filed on Sep. 17, 1999.

(30) Foreign Application Priority Data

Sep. 24, 1998 (DE) .......................... 198 43 906

(51) Int. Cl.⁷ .............................. F02C 7/12; F02C 7/224
(52) U.S. Cl. ................. 60/39.06; 60/39.75; 60/736; 415/114
(58) Field of Search ................ 60/39.06, 39.75, 60/736; 415/114

(56) References Cited

U.S. PATENT DOCUMENTS

| | | | |
|---|---|---|---|
| 2,647,368 A | 8/1953 | Triebbnigg | |
| 2,783,613 A | 3/1957 | Von Zborowski | |
| 3,600,890 A | 8/1971 | White et al. | |
| 3,734,639 A | 5/1973 | Short | |
| 5,003,766 A | * 4/1991 | Paul | 60/39.75 |
| 5,125,793 A | * 6/1992 | MacArthur et al. | 415/114 |

* cited by examiner

Primary Examiner—Louis J. Casaregola
(74) Attorney, Agent, or Firm—Herbert L. Lerner; Laurence A. Greenberg; Werner H. Stemer

(57) ABSTRACT

A gas turbine and a method for operating a gas turbine includes a combustion chamber, a turbine having rows of blades, an air compressor, a combustion-air line for feeding compressed air into the combustion chamber, a fuel supply unit, at least one fuel line, at least one cooling-air line. Some of the blades have an interior defining cavities whereby first cavities direct at least a portion of fuel to the combustion chamber through the first cavities at least in a section of the blades, thereby preheating the fuel before being introduced into the combustion chamber. The system defined by the first cavities and the section of the blades is closed relative to an interior of the gas turbine. Second cavities fluidically connect to the air compressor and receive at least a portion of the cooling air for cooling the blades.

13 Claims, 2 Drawing Sheets

FUEL PREHEATING IN A GAS TURBINE

CROSS-REFERENCE TO RELATED APPLICATION

This application is a continuation of copending International Application No. PCT/DE99/02985, filed Sep. 17, 1999, which designated the United States.

BACKGROUND OF THE INVENTION

Field of the Invention

The invention related to a method of operating a gas turbine having a combustion chamber, a turbine including at least two rows of blades, and an air compressor. Compressed air and fuel are fed to the combustion chamber and cooling air is fed to the turbine. The invention also relates to a gas turbine working, in particular, according to the method.

The invention relates, in particular, to a gas turbine that works in combination with a steam turbine such that exhaust gas flowing out of the gas turbine is utilized for providing high-pressure steam expanded in the steam turbine while performing mechanical work. Such combinations of gas turbines and steam turbines are realized, for example, in combined-cycle power plants; they permit the generation of electrical power with efficiencies of 50% and more.

A gas turbine is generally a combination of a compressor for air, at least one combustion chamber for burning a fuel with the air compressed by the compressor, and a turbine in the actual sense, in which the hot flue gas produced in the combustion chamber is expanded to perform work. As a rule, the compressor and the turbine are mechanically coupled to one another. The air compressor is frequently a turbocompressor.

During operation of a gas turbine, the blades of the turbine are normally cooled. Thus, a large number of documents disclose providing an open cooling system for forming film cooling with cooling air, the open cooling system directing the cooling air used for the cooling through the blades of the turbine. A portion of the compressed air is used as cooling air, which then discharges in the turbine from open blades and is admixed with the flue-gas flow. As a result of the outflow of the cooling air from guide and/or moving blades, the open air cooling of the blades leads to a reduction in the temperature of the flue gases inside the turbine and downstream of the turbine on the outflow side. Such a reduction in temperature reduces the efficiency of the gas turbine.

In addition, the thermodynamic efficiency of a combination of a gas turbine and a steam turbine is not only determined by the efficiency of the gas or steam turbine, but, to a great extent, is also dependent on the thermodynamic coupling of the two machines. An essential determining factor is the temperature of the exhaust gas flowing out of the gas turbine.

To achieve a high efficiency, the prior art includes heating the compressed air by indirect heat exchange with the exhaust gas from the turbine.

To increase the exhaust-gas temperature, a concept for a guide blade of a gas turbine is described in German Published, Non-Prosecuted Patent Application DE 43 30 613 A1. The concept disclosed therein directs a small fraction of fuel directly to the turbine in an open cooling system with the cooling air. As a result, interheating of the exhaust gas is achieved without expensive measures in terms of equipment, which leads to an increase in the efficiency.

Cooling concepts that direct cooling fluid in a closed system instead of in an open system likewise increase the efficiency.

For example, German Published, Non-Prosecuted Patent Application DE 196 21 385 A1 discloses directing a first substance for cooling the guide blades in a closed cooling system in a guide blade and a moving blade. The first substance endothermically reacts with a second substance. The energy required for an endothermic reaction can preferably be effected by the absorption of heat from the hot flue-gas flow. The reaction product is then fed to the combustion chamber. The chemically bonded reaction energy and the heat absorbed by the substances are released in the combustion process. The release reduces the fuel consumption and, consequently, increases the efficiency of the gas turbine.

SUMMARY OF THE INVENTION

It is accordingly an object of the invention to provide a fuel preheating in a gas turbine that overcomes the hereinafore-mentioned disadvantages of the heretofore-known devices and methods of this general type and that provides a fuel preheating method that achieves a good cooling of the turbine blades and an increased efficiency, and a gas turbine suitable, in particular, for carrying out the method, the turbine having a high efficiency.

With the foregoing and other objects in view, there is provided, in accordance with the invention, a method of operating a gas turbine, including the steps of providing a gas turbine having a combustion chamber, a turbine having at least two rows of blades, at least some of the blades having an interior defining first cavities and second cavities, and an air compressor, feeding compressed air and fuel to the combustion chamber, feeding cooling air to the turbine, directing at least a portion of fuel at least in a section of the blades through the first cavities and simultaneously preheating the portion of fuel before the portion of fuel is introduced into the combustion chamber, and directing cooling air fed to the turbine in a further section of the blades through the second cavities and discharging the cooling air at least partly at the blades.

The objectives of the invention are achieved with the method according to the invention by virtue of the fact that at least one portion of the fuel, before it is introduced into the combustion chamber, flows in a section of the blades through cavities formed in the interior space of the blades and in the process is preheated simultaneously. The thermal energy that is, thus, absorbed by the fuel advantageously no longer needs to be dissipated through a cooling fluid, for example, cooling air. The cooling air that is, thus, saved reduces the work of the air compressor, which otherwise would have to be performed by the turbine. In addition, preheated fuel passes into the combustion chamber. Consequently, the efficiency of the gas turbine is increased.

In accordance with another mode of the invention, the cavities formed in the blades and in which the fuel flows form a closed system relative to the interior of the gas turbine. The system ensures that the fuel no longer comes into contact with other flow media, such as, for example, a cooling fluid or the flue gas (action fluid). In particular, due to the closed system, uncontrolled combustion outside the combustion chamber is ruled out.

In accordance with a further mode of the invention, a very simple embodiment is characterized by the fact that the fuel successively flows through a plurality of rows, in particular, through all the rows, of blades and is then fed to the combustion chamber.

In accordance with an added mode of the invention, the fuel is fed separately, i.e., in separate flows, through a plurality of rows of blades and is then respectively fed separately or as a uniform flow to the combustion chamber. Such a fuel feed advantageously permits load-dependent control of the gas turbine.

In accordance with an additional mode of the invention, the cooling air fed to the turbine advantageously flows in a further section of the blades through other cavities formed in the interior space of the blades. The cooling air discharges at least partly at the blades in a preferred manner such that an air film forms on the outer surface of the blades.

In accordance with yet another mode of the invention, small fractions of fuel, which burn in the turbine, are preferably admixed with the cooling air to increase the temperature of the exhaust gas flowing out of the turbine.

With the objects of the invention in view, there is also provided gas turbine, including a combustion chamber, a turbine having at least two rows of blades, at least some of the blades having an interior defining first cavities and second cavities, an air compressor, a combustion-air line for feeding compressed air into the combustion chamber, the combustion-air line fluidically connected to the air compressor and the combustion chamber, a supply unit for supplying fuel, at least one fuel line for feeding fuel into the combustion chamber, the at least one fuel line fluidically connected to the combustion chamber and to the supply unit, at least one cooling-air line for feeding cooling air into the turbine, the at least one cooling-air line fluidically connected to the turbine and to the air compressor, the first cavities fluidically connected to the combustion chamber and to the supply unit for directing at least a portion of fuel to the combustion chamber from the supply unit through the first cavities at least in a section of the blades and, thereby, preheating the portion of fuel before being introduced into the combustion chamber, a system defined by the first cavities and the section of the blades being closed relative to an interior of the gas turbine, and the second cavities fluidically connected to the air compressor and receiving at least a portion of the cooling air through the second cavities for cooling the blades.

The gas turbine includes a combustion chamber, a turbine having at least two rows of blades, an air compressor, a combustion-air line for feeding compressed air, at least one fuel line for feeding fuel into the combustion chamber, and at least one cooling-air line for feeding cooling air into the turbine. The objectives of the invention are achieved in the gas turbine of the invention where at least a portion of the fuel is directed to the combustion chamber from a supply unit through cavities formed in the interior space of the blades and which, at least in a section of the blades, form a closed system relative to the interior of the gas turbine.

In accordance with yet a further feature of the invention, the fuel is preferably fed successively through a plurality of rows, in particular, through all the rows, of blades to the combustion chamber.

In accordance with a concomitant feature of the invention, alternatively, the fuel is preferably fed separately through a plurality of rows of blades and then respectively separately or as a uniform flow to the combustion chamber, a factor which, in particular, has an advantageous effect on the controllability of the gas turbine.

The advantages achieved with the invention include, in particular, the fact that, by feeding fuel through cavities that are formed in the interior space of the blades and that form a closed system relative to the interior of the gas turbine, the fuel absorbs thermal energy which otherwise would have to be dissipated by a cooling fluid. Where the fuel consumption is reduced by heating the fuel on one hand, cooling air for the turbine is saved on the other hand. And, the work of the air compressor that otherwise would have to be performed by the turbine is reduced. Consequently, the efficiency of the gas turbine is increased. In addition, efficiency losses in the turbine due to mixing of hot action fluid with cooling air are reduced due to the fact that cooling air discharges at the blades only to a reduced extent.

Other features that are considered as characteristic for the invention are set forth in the appended claims.

Although the invention is illustrated and described herein as embodied in a fuel preheating in a gas turbine, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
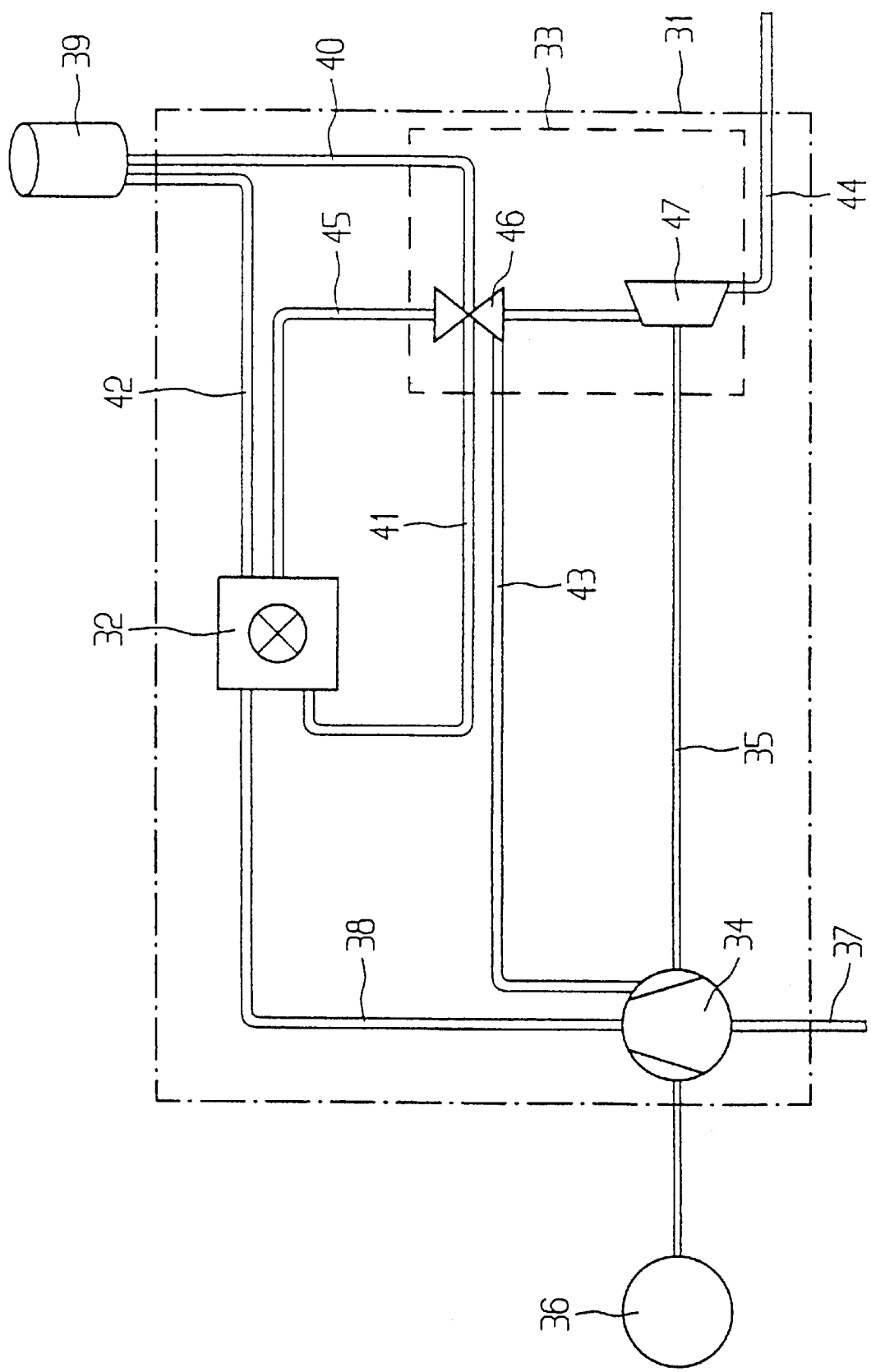
FIG. 1 is a block circuit diagram of a gas turbine according to the invention.

In all the figures of the drawing, sub-features and integral parts that correspond to one another bear the same reference symbol in each case.

Referring now to the figures of the drawings in detail and first, particularly to FIG. 1 thereof, there is shown a gas turbine 31. The gas turbine includes a turbine 33 with an air compressor 34 coupled through a turbine shaft 35 and a generator 36. The turbine also includes a combustion chamber 32 connected upstream of the turbine 33. The air compressor 34 has an intake line 37 on the suction side and at least one cooling-air line 43 on the pressure side. The intake line 37 opens into the turbine 33. In addition, the air compressor 34 has a combustion-air line 38 on the pressure side. The combustion-air line 38 opens into the combustion chamber 32.

For the fuel fraction to be preheated, a fuel line 40 leads from a supply unit 39 to the turbine 33. Furthermore, a fuel line 41 for the preheated fuel 6 is connected to the turbine 33. In addition, the turbine 33 has an exhaust-gas line 44. A flue-gas line 45 connects the combustion chamber 32 to the turbine 33. Furthermore, the combustion chamber 32 is also connected directly to the supply unit 39 through a fuel line 42.

The turbine 33 includes at least two rows 46, 47 of blades 1, in particular, a guide wheel 46 and an impeller 47. Cavities 20, 22, 22a, 23, 23a are formed in the interior 21 of the blades 1. The cavities 20, 22, 22a, 23, 23a formed in the interior of the blades 1 form, at least in a section of the blades, a closed system relative to the interior of the gas turbine 31. In a further section of the blades 1, other cavities 25, 25a formed in the interior of the blades 1 form an open system.

Figure 2:
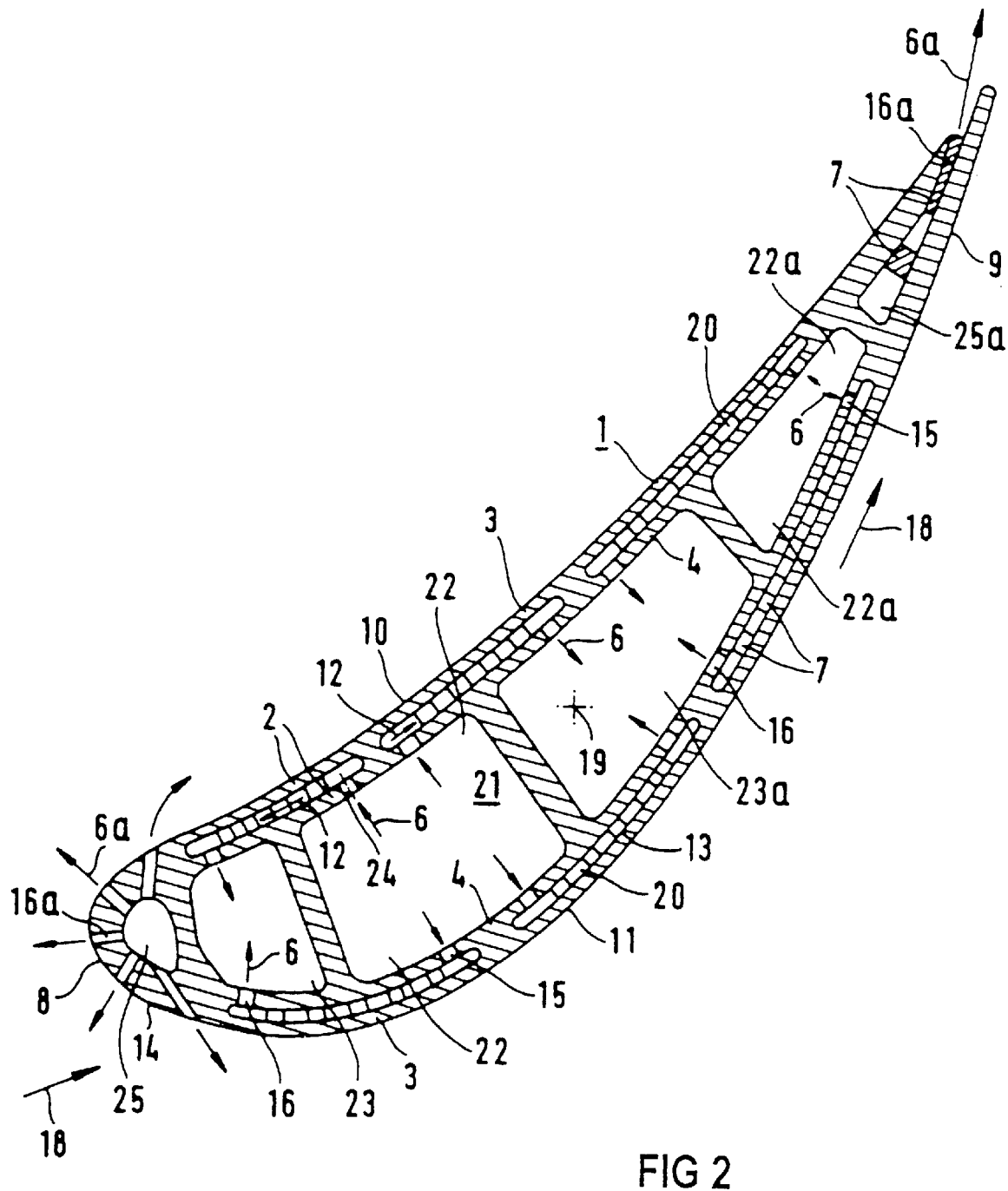
FIG. 2 is a cross-sectional view of a blade for the gas turbine according to FIG. 1.

FIG. 2 illustrates the constructional and functional features in cross section of a preferred use of a blade 1 of a gas turbine 31. The blade 1 extends along a main axis 19. The blade 1 may be curved or twisted along the main axis 19 so that the cross section of the blade 1, shown in FIG. 2, may vary over the main axis 19. At its non-illustrated end, the blade 1 has a blade root for fastening the blade 1. The blade 1 has a wall structure 2 having an inflow region 8, an outflow region 9, a pressure side 10, and a suction side 11, which are, respectively, disposed opposite one another. In addition, the wall structure 2 has an outer wall 3, which encloses an interior space 21. Cavities 20, 22, 22a, 23, 23a, 25, 25a that are separate from one another, in particular, fuel feeds 22, 22a, fuel discharges 23, 23a, and cooling-air feeds 25, 25a, are provided in the interior space 21 and are respectively directed essentially parallel to the main axis 19. The feeds 22, 22a, 25, 25a and discharges 23, 23a extend from the non-illustrated blade root up to a non-illustrated second end, opposite the first end of the blade 1, where they are closed. A hot gas 18 (action fluid) flows around the blade 1 so that an outer surface 14 of the outer wall 3 can be acted upon by the hot gas 18. The hot gas 18 flows against the blade 1 at the inflow region 8 and flows along the blade 1 up to the outflow region 9. The cooling-air feed 25 of the inflow region 8, the fuel discharge 23, the fuel feed 22, the fuel discharge 23a, the fuel feed 22a, and the cooling-air feed 25a of the outflow region 9 are disposed one after the other in the interior space 21 in the direction of flow of the hot gas 18. On the suction side 11 and the pressure side 10, the wall structure 2 has a plurality of chambers 20 disposed one behind the other. Further non-illustrated chambers are provided on the suction side 11 and on the pressure side 10 in the direction of the main axis 19. The chambers 20 are disposed between an inner wall 4 facing the interior space 21 and the outer wall 3. Each chamber 20 has a respective inlet 15 for fuel 6, which in each case is connected to an associated fuel feed 22, 22a. The inlet 15 of a respective chamber 20 extends along an inlet axis 24 that is essentially perpendicular to the outer wall 3. As a result, additional impingement cooling of the outer wall 3 can be achieved when the fuel 6 flows into the chamber 20. Furthermore, each chamber 20 has an outlet 16, which produces a fluidic connection between the chamber 20 and an associated fuel feed 23, 23a. Respectively, the fuel 6 can flow through the chambers 20 in the direction of flow or against the direction of flow of the hot gas 18. A plurality of heat-transfer elements 7 disposed one after the other are preferably disposed in each chamber 20 in the direction of flow 12 of the fuel 6. Further heat-transfer elements 7 disposed in the chambers 20 along the axis 19 are not shown. The heat-transfer elements may be offset in the direction of flow 12 relative to the heat-transfer elements 7 that are shown. As a result, high heat transfer in the chambers 20 can be achieved.

During operation of the gas turbine 31, a first partial flow of fuel 6, preferably fossil fuel, for example, natural gas or coal gas, is fed to the combustion chamber 23 through the fuel line 42. In addition, a second partial flow of fuel 6 that has been preheated in the turbine 33 is fed to the combustion chamber 32 through the fuel line 41. The fuel 6 is preferably preheated by allowing the fuel 6 fed through the fuel line 40 to the turbine 33 to flow through the cavities 20, 22, 22a, 23, 23a, formed in the interior space 21 of the blades 1 as a closed system relative to the interior of the gas turbine 31, and for the fuel 6 to absorb thermal energy in the process. The fuel 6 flows into the blade 1 at a non-illustrated first end and flows through the blade 1 up to the non-illustrated second end. In each case, a portion of the fuel 6 is drawn off into each chamber 20, disposed axially one above the other such that the fuel portion absorbs heat through heat exchange with the outer wall 3 and the heat-transfer elements 7. As a result, the fuel 6 is preheated and the outer wall 3 is cooled at the same time. After flowing through the chamber 20, the fuel 6 enters a fuel discharge 23, 23a. The fuel flow combined again in the fuel discharges 23, 23a passes out of the blade 1 again through the non-illustrated first end.

The fuel 6 is either fed successively through a plurality of rows 46, 47, in particular, through all the rows, of blades 1 of the turbine or separately, i.e., in separate flows, through a plurality of rows 46, 47 of blades 1 of the turbine and then, in each case, separately or as a uniform flow to the combustion chamber 32.

The splitting of the fuel 6 into partial flows advantageously permits better load-dependent controllability of the turbine 33.

In a preferred exemplary embodiment, fuel lines 40, 41, 42 and the cavities 20, 22, 22a, 23, 23a formed in the interior space 21 of the blades 1 as a closed system relative to the interior of the gas turbine 31 are configured to feed the fuel 6 to the combustion chamber 32 such that it is mainly preheated, and, at best, fully preheated.

The fuel 6 thus preheated is burned in the combustion chamber 32 together with the fuel fed directly through the fuel line 42 if need be and with the compressed combustion air or with fresh air. The hot flue gas 18 (action fluid) produced during the combustion is directed through the flue-gas line 45 into the turbine 33. The flue gas expands there and drives the turbine 33. The turbine 33, in turn, drives the air compressor 34 and the generator 36. The flue gas 18 leaves the turbine 33 as exhaust gas through the exhaust-gas line 44 in the direction of a non-illustrated stack. Alternatively, the exhaust gas can also preferably be utilized for generating steam in a heat-recovery steam generator of a gas- and steam-turbine plant. European Patent EP 0 410 111 B1, for example, discloses such a gas- and steam-turbine plant.

The flue gas 18 has a high temperature of more than 1100° C. when entering the turbine 33. Therefore, parts of the turbine 33, in particular, the blades 1, must be additionally cooled. Most of the thermal energy to be dissipated is absorbed by the fuel 6 and dissipated in those sections of the blades 1 through which the fuel flows. In the remaining sections of the blades 1, in particular, in the inflow region 8 and outflow region 9, cooling air 6a flows through other cavities 25, 25a formed as an open system in the interior space 21 of the blades 1. The cooling-air feed 25, shown in FIG. 2, has a plurality of outlets 16 in the inflow region 8, through which outlets 16 the cooling air 6a reaches the outer surface 14 of the blade 1. The configuration ensures additional film cooling of the blades 1 by the cooling air 6a. The cooling-air feed 25a of the outflow region 9 likewise has an outlet 16a for the outflow of cooling air 6a. Heat-transfer elements 7 are disposed between the outer walls of the suction side 11 and the pressure side 10.

Alternatively or cumulatively, small fractions of fuel 6 that burn in the turbine 33 may be admixed with the cooling air 6a to increase the temperature of the exhaust gas flowing out of the turbine 33.

The blades 1 preferably used in the turbine 33 are characterized in that the outer wall 3 of the blades 1, on the suction side 11 and the pressure side 10, have a system that is closed relative to the interior of the gas turbine 31 and through which at least some of the fuel 6 flows before it is introduced into the combustion chamber 32, cools the blades 1 and in the process is preheated at the same time without passing into the flow of a hot action fluid 18 flowing around the blades 1. In addition, the inflow region 8 and outflow region 9 of the blades 1 may be cooled with an open system, in which case, cooling air is preferably used.

The invention is characterized in that, by feeding fuel 6 through cavities 20, 22, 22a, 23, 23a that are formed in the interior space 21 of the blades 1 and that form a closed system relative to the interior of the gas turbine 31, the fuel 6 absorbs thermal energy that otherwise would have to be dissipated by a cooling fluid. The fuel consumption is reduced by heating the fuel 6 on one hand, and cooling air 6a for the turbine 33 is saved on the other hand. Thus, the work of the air compressor 34 that otherwise would have to be performed by the turbine 33 is reduced. The efficiency of the gas turbine 31 is, consequently, increased. In addition, efficiency losses in the turbine 33 due to mixing of hot action fluid 18 with cooling air 6a are reduced due to the fact that cooling air 6a discharges at the blades 1 only to a reduced extent.

I claim:

1. A method of operating a gas turbine, which comprises:
    providing a gas turbine having:
        a combustion chamber;
        a turbine having at least two rows of blades, at least some of the blades having an interior defining first cavities and second cavities; and
        an air compressor;
    feeding compressed air and fuel to the combustion chamber;
    feeding cooling air to the turbine;
    directing at least a portion of fuel at least in a section of the blades through the first cavities and simultaneously preheating the portion of fuel before the portion of fuel is introduced into the combustion chamber; and
    directing cooling air fed to the turbine in a further section of the blades through the second cavities and discharging the cooling air at least partly at the blades.

2. The method according to claim 1, which further comprises forming the first cavities in which the portion of fuel flows as a closed system relative to an interior of the gas turbine.

3. The method according to claim 1, which further comprises:
    successively directing the portion of fuel through a plurality of rows of blades; and
    subsequently feeding the portion of fuel to the combustion chamber.

4. The method according to claim 1, which further comprises:
    successively directing the portion of fuel through all of the rows of blades; and
    subsequently feeding the portion of fuel to the combustion chamber.

5. The method according to claim 1, which further comprises
    feeding the portion of fuel in separate partial flows through a plurality of rows of blades; and
    subsequently feeding the portion of fuel separately to the combustion chamber.

6. The method according to claim 1, which further comprises
    feeding the portion of fuel in separate partial flows through a plurality of rows of blades; and
    subsequently feeding the portion of fuel as a uniform flow to the combustion chamber.

7. The method according to claim 1, which further comprises discharging the cooling air at the blades to form an air film on an outer surface of the blades.

8. The method according to any of claims 1 to 7, which further comprises admixing small fractions of fuel to be burned in the turbine, with the cooling air to increase a temperature of exhaust gas flowing out of the turbine.

9. A gas turbine, comprising:
    a combustion chamber;
    a turbine having at least two rows of blades, at least some of the blades having an interior defining first cavities and second cavities;
    an air compressor;
    a combustion-air line for feeding compressed air into said combustion chamber, said combustion-air line fluidically connected to said air compressor and said combustion chamber;
    a supply unit for supplying fuel;
    at least one fuel line for feeding fuel into said combustion chamber, said at least one fuel line fluidically connected to said combustion chamber and to said supply unit;
    at least one cooling-air line for feeding cooling air into said turbine, said at least one cooling-air line fluidically connected to said turbine and to said air compressor;
    said first cavities fluidically connected to said combustion chamber and to said supply unit for directing at least a portion of fuel to said combustion chamber from said supply unit through said first cavities at least in a section of said blades and, thereby, preheating said portion of fuel before being introduced into said combustion chamber, a system defined by said first cavities and said section of said blades being closed relative to an interior of the gas turbine; and
    said second cavities fluidically connected to said air compressor and receiving at least a portion of the cooling air through said second cavities for cooling said blades.

10. The gas turbine according to claim 9, wherein said at least two rows of blades is a plurality of rows of blades, and said combustion chamber receives a portion of fuel successively through said plurality of rows.

11. The gas turbine according to claim 9, wherein said at least two rows of blades is a plurality of rows of blades, and said combustion chamber receives a portion of fuel successively through all of said rows.

12. The gas turbine according to claim 9, wherein said at least two rows of blades is a plurality of rows of blades, and said combustion chamber receives a portion of fuel separately from each of said rows.

13. The gas turbine according to claim 9, wherein said at least two rows of blades is a plurality of rows of blades, and said combustion chamber receives a portion of fuel as a uniform flow from said rows.

* * * * *